United States Patent [19]
Ostlund et al.

[11] 3,962,624
[45] June 8, 1976

[54] THYRISTOR RECTIFIER

[75] Inventors: Bernt Ostlund; Georg Lindblom, both of Ludvika, Sweden

[73] Assignee: Allmanna Svenska Elektriska Aktiebolaget, Vasteras, Sweden

[22] Filed: Nov. 21, 1974

[21] Appl. No.: 526,068

Related U.S. Application Data

[63] Continuation-in-part of Ser. No. 374,378, June 28, 1973.

[52] U.S. Cl. .......................... 321/27 R; 307/252 L
[51] Int. Cl.² .......................................... H02M 7/00
[58] Field of Search ............ 307/252 L; 321/11–14, 321/27 R

[56] References Cited
UNITED STATES PATENTS 3,794,908   2/1974   Lindblom et al. ................ 321/27 R
3,842,337   10/1974   Ekstrom et al. ................... 321/27 R

*Primary Examiner*—William M. Shoop

[57] ABSTRACT

A thyristor rectifier for a static converter is formed of a plurality of thyristors, each provided with a control device and a control circuit for the entire rectifier connected to these control devices. Detectors are provided and arrangements are provided response to the voltage over a thyristor to emit an indicating pulse to the detectors when the voltage over the thyristors amounts to a certain value. A selector is provided for sensing these pulses and for recording the indicating pulses emitted through the detectors to a counter. Control units are also provided which control and synchronize the control and counter in relation to each other.

5 Claims, 4 Drawing Figures

THYRISTOR RECTIFIER

RELATED APPLICATIONS

This application is a continuation-in-part of application Ser. No. 374,378, filed June 28, 1973.

BACKGROUND OF THE INVENTION

1. Field of the Invention

The present invention relates to a thyristor rectifier for a static converter, said thyristor rectifier comprising a plurality of thyristors, each one provided with a control device controlled from a control circuit for the entire rectifier, said control circuit being influenced by the control system which controls the whole static converter and its commutations. Said control device is provided with signal emitters which emit an indicating pulse to detectors when the voltage in the conducting direction over the proper thyristor amounts to a certain value.

2. The Prior Art

Such a thyristor rectifier is known, for example, from U.S. Pat. no. 3,794,908 and the purpose of the present invention is to record, with the help of said indicating pulses, how many and which of the thyristors and the corresponding control devices are faultless or defective, so that a constant supervision of the condition of the rectifier is ensured.

Means for this purpose are known previously, and as a rule they are based on glow lamps which are connected over the thyristors and relatively primitive circuits which, among other things, are inconvenient for transmission between different potential levels or at a longer distance.

SUMMARY OF THE INVENTION

This invention, on the other hand, is based on the use of a selector which senses said indicating pulses by way of memory elements and transmits these pulses by way of a transmission system to a counter, the counter and the selector being synchronized with respect to each other by means of control systems connected together. The device comprises a thyristor rectifier for a static converter formed of a plurality of thyristors and which has a control device for each thyristor connected with a control circuit for the entire rectifier, detectors to which indicating pulses are emitted when the voltage over a thyristor amounts to a certain value, and a sensing member which includes a selector for recording the indicating pulses emitted through the detectors, a counter, to which the pulses from the selector are transmitted, and a control unit for controlling and synchronizing the selector and counter in relation to each other.

Compared to previously known systems the invention provides detailed information about the condition of the thyristors and their control devices in a clear way which is well suited for operation in unmanned converter stations. Simultaneously, the construction of the system is simple. Among other things, only two transmission channels per rectifier are necessary from high potential to earth potential. Furthermore, the device according to the invention is able to utilize some of the components already present in the rectifier circuit.

BRIEF DESCRIPTION OF THE DRAWINGS

In other respects the invention will be further described with reference to the drawings, in which.

DESCRIPTION OF THE PREFERRED EMBODIMENTS

Figure 1:
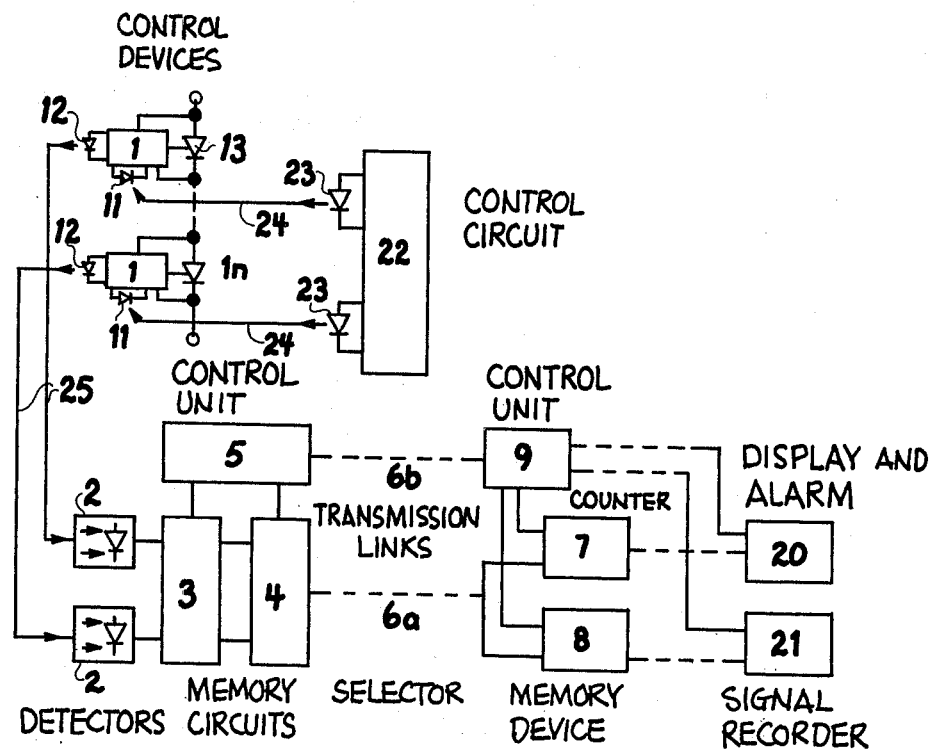
FIG. 1 shows a thyristor rectifier having a supervision device according to the invention.

The thyristor rectifier may consist of a plurality of series-connected thyristors 13-1n, and the rectifier may be included in a static converter for high voltage, in which it forms a rectifier bridge, together with several similar rectifiers. One end connection of each rectifier is connected to the direct-current side of the rectifier bridge and the other is connected to the alternating-current side of the bridge.

To the control electrodes of each thyristor there is connected a control device 1, for example according to said U.S. Pat. no. 3,794,908 having a detector in the form of a photo diode 11 which is influenced by light pulses from a control circuit 22 for the entire rectifier. This control circuit is influenced by the control system of the static converter, which has not been shown, and the control circuit 22 delivers signals through the light diodes 23 and light conductors 24 to the control devices 1 for ignition of the thyristors.

Each control device 1 is provided with a signal emitter in the form of a light diode 12 which emits an indicating pulse when the voltage in the conducting direction over the proper thyristor amounts to a certain value. These indicating pulses are transmitted through light conductors 25 to detectors 2 which are built up of photo diodes and which form input circuits for memory circuits 3, where the indicating pulses are stored for each working period of the device.

To the memory circuits 3 the indicating pulses arrive quite at random during each working period, and for recording the pulses there is a selector 4 sensing the memory circuits and the pulses stored in them. The selector 4 is controlled by a control unit 5 which determines the rate of the selector and also neutralizes the memory circuits for each concluded working period so that a new series of indicating pulses can be stored and recorded.

A pulse train controlled by the control unit 5 is sent out from the selector 4, each of the different pulses in the pulse train, as well as any intervals therebetween resulting from failing pulses, corresponding to the condition of one of the thyristors 13-1n. These pulses are transmitted by way of a transmission link 6 a to a counter 7. For synchronization of the counter 7 there is a control unit 9 which is connected, by way of another transmission link 6 b, to the control unit 5 for the selector 4. In this way, the counter 7 will record the pulses emanating from the selector 4 or any intervals therebetween resulting from failing pulses. The counter 7 may also have the character of a countdown device which, before the selector 4 has sensed the pulses, contains a signal which corresponds to the total number of thyristors. Said signal is then counted down by the pulses coming from 4. After scanning, the counter contains the number of faulty thyristors.

The result from the counter 7 can be made available for recording by means of a special indicating member 20 which, for example, may be in the form of a so-called numerical display tube indicating the number of faulty thyristors. It would be possible to have an alarm device or a release device, preferably a multi-step device, so that a certain number of faulty thyristors causes a warning signal whereas an alarm signal or a release signal is started if the number approaches the critical number with regard to the strength of the thyristors in question.

A memory device 8 recording the position of faulty thyristors may be arranged parallel to the counter 7 and, like this counter, be controlled from the control unit 9. The output circuit 21 for said memory may be in the form of a diagram having lamps or signal flags. 21 may be constructed as a recorder which, for example, makes a record of faultless and damaged thyristors in the rectifier at periodic intervals.

Because the counter 7 and the memory circuit 8 are arranged in parallel, they are able to work at individual speed so that the circuit 20 always provides the current, numerical expression, whereas the member 21 with some delay denotes the distribution of whole and damaged thyristors at a suitable time, for example when the number of damaged thyristors increases. Of the components shows in the FIGS., 2 – 5 may suitably be arranged on rectifier potential, i.e., the same potential as the thyristors 13-1n and control device 1, 2 – 5 thus being mounted on the chassis of the rectifier. The remaining components, which should be more easily accessible, should be mounted at earth potential and the transmission links 6a and b are suitably constituted by light conductors for optical signal transmission. In principle, the output circuits 20 and 21 may be positioned anywhere, which in the case of an unmanned converter station implies that they may be situated in a main control station remote from the converter station, the signals from 7 and 8 then being transmitted through telecommunications. Possibly, all components from 2 onwards may be arranged at earth potential, which makes possible some simplifications as to the connections between the components. The components 2 – 5 are substantially similar to components 2, 3, 5 and 10 according to Swedish patent application No. 9080/72, so that the components for these two devices may be complementary to each other and, if possible, common for both.

As mentioned previously, the pulses from the detectors 2 arrive rather arbitrarily at the memory circuits 3, namely according as the different thyristors 13-1n take up voltage when the voltage after a conducting interval grows over the rectifier. So as to make it possible to record the pulses and thus control the condition of the thyristors, the memory circuits 3 have been introduced so that the selector 4 is able to work at a suitable rate.

Figure 2:
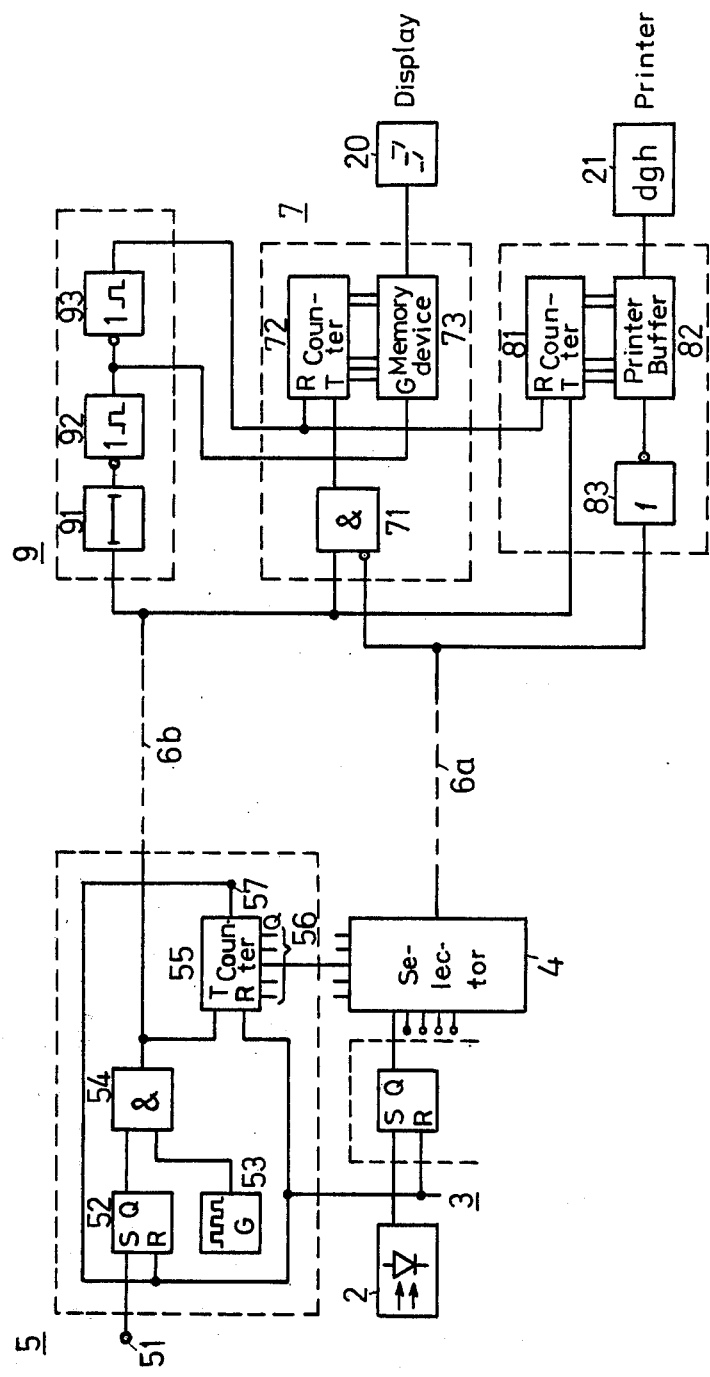
FIG. 2 shows the components 3 to 9 of FIG. 1 in more detail.

FIG. 2 shows the components 3 – 9 of FIG. 1 in more detail. Only one of the detectors 2 is shown in FIG. 2, together with its corresponding memory circuit 3. For each detector 2 there is a corresponding memory circuit 3, for instance formed as a bistable flip-flop which is switched on by a signal from 2. Thus, if there is a fault in a thyristor in FIG. 1, the detector 2 in question will not give any signal so that the corresponding memory circuit 3 is not switched on.

The signals in the memory circuits 3 are sensed by the selector 4 controlled from control unit 5. Control unit 5 has an input start terminal 51 by which this unit and thus selector 4 is started. Unit 5 is suitably started by a periodic signal with a certain frequency so that the state of the whole thyristor rectifier is registered at suitable intervals.

A bistable flip-flop 52 is switched on by the starting signal on 51, thus giving a first signal to an And-gate 54. Thus the pulse from an oscillator 53 can pass this And-gate to a counter 55. Counter 55 has a number of outputs 56 by which a series of digital signals 0 is transmitted to selector 4, thus stepping forward the inputs of 4 from one memory circuit 3 to another at a certain rate. Thus the oscillator 53 will control selector 4 though counter 55. This counter is provided with a further output 57 giving a signal when the whole series of signal combinations over 56 has been transmitted to selector 4. The signal from 57 is suitably activated by the last signal in the series from 56.

The signal over 57 switches off flip-flop 52, counter 55 and memory circuit 3. Thus counter 55 and selector 4 will only go through one signal sequence at a time, whereafter the memory signals in 3 are cancelled.

Figure 3:
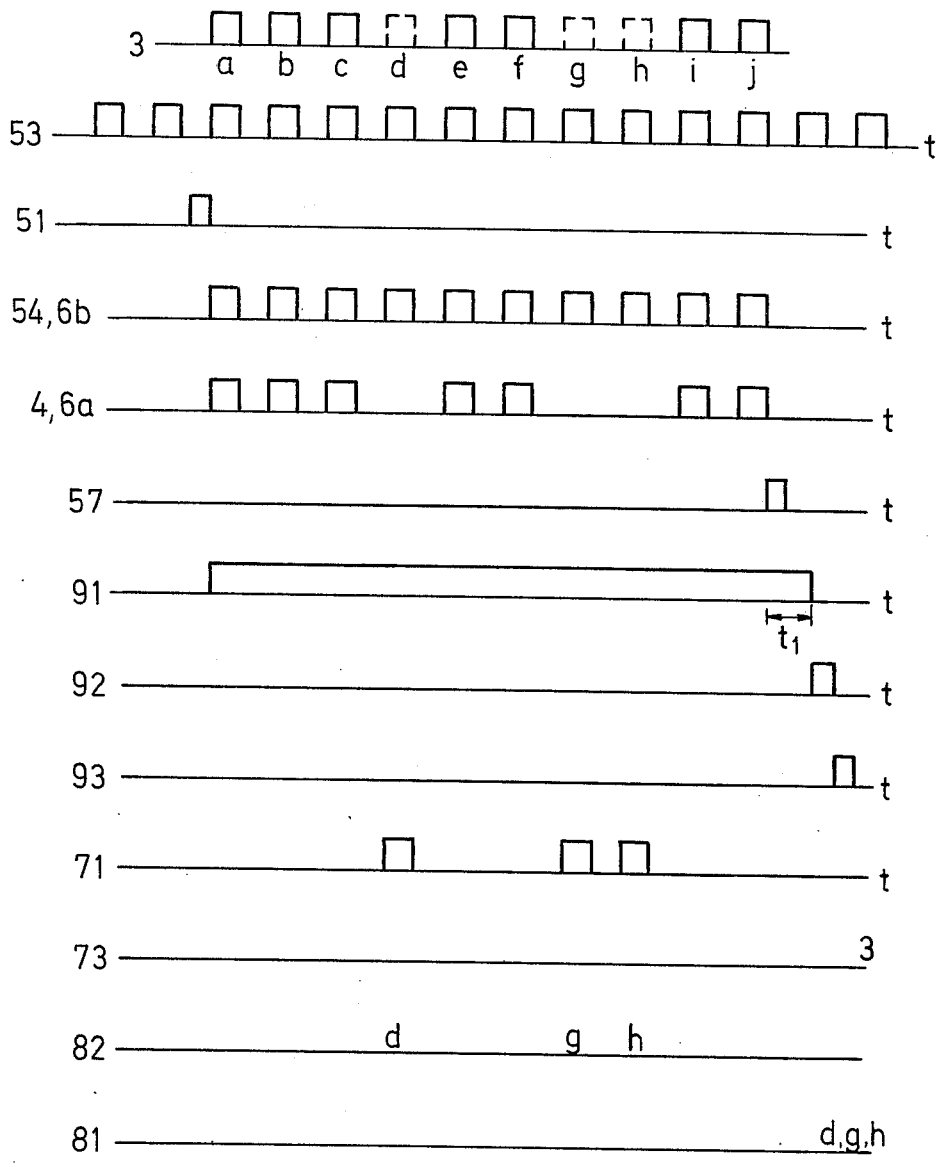
FIG. 3 is an explanatory diagram.

The first line of FIG. 3 shows the signals stored in the memory circuit 3 for a series of ten thyristors $a - j$. As indicated, there are no signals for $d$, $g$ and $h$ showing faults in these thyristors or their control circuits. The second line shows the continuous pulse train from the oscillator 53, while the fourth line shows the train of ten pulses which passes the And-gate 54 to counter 55 and transmission link 6b. Counter 55 gives a series of ten digital signals, not shown, to detector 4 which is stepped forward to sense off the signals of circuit 3 so that the signals from 4 to transmission link 6a will be as shown in the fifth line of FIG. 3. The difference between the first and fifth line is that the signals from 3 could be regarded as permanent signals in relation to the signals of the other lines, being pulses coming up one after the other with a certain frequency.

When counter 55 has sent on its last binary signal over 56 it will send out a blocking pulse over terminal 57 as shown in the sixth line of FIG. 3, thus switching off flip-flop 52, counter 55 and memory circuit 3.

The frequency of oscillator 53 could be chosen independently of the operating frequency of the thyristor rectifier.

The signals from 4 and 5 are sent over transmitting links 6a and b, respectively, to components 7 – 9. The signals over 6b influence a monostable flip-flop 91 with a switch-off time of $t_1$ which is longer than the intervals between the pulses over 6b. Thus 91 will give a signal of the same length as the pulse train from 6b plus the time $t_1$, as shown in FIG. 3. At the end of this signal, another monostable flip-flop 92 will give a short pulse influencing a third monostable flip-flop 93 giving a pulse at the end of the pulse from 92. The pulses from 92 and 93 influence 7 and 8 as explained below.

Counter 7 has an input And-gate 71 influenced by the pulses over 6a and 6b.

In FIG. 2 the lower input on 71 is shown as a negative input, which means that the pulses over 6b corresponding to thyristors $a$, $b$, $c$, $e$, $f$, $i$, $j$ coinciding with the pulses from 4 over 6a, will not pass through And-gate 71. The pulses over 6b corresponding to faulty thyristors $d$, $g$, $h$, however, will pass through And-gate 71 because of the missing pulses from 4. Thus counter 72 will register these three pulses and transmit them as a digital signal to memory circuit 73.

At the end of the pulse train over 6b, that is, at the end of the signal from 91, the flip-flop 92 will influence memory circuit 73 over input G so that this circuit stores the signal from 72. This stored signal could then be shown on the display 20. When memory circuit 73 has been activated from 92, counter 72 will be switched off by the signal from 93.

If And-gate 71 had been provided with two positive inputs, counter 72 would have registered the number of sound thyristors, in this case seven.

In memory device 8 there is a counter 81 controlled from the pulses over 6b and giving digital signals to the printer buffer 82. This printer buffer has an input gate 83 which gives an output signal if there is a lack of signal from 4 over 6a. Thus printer buffer 82 will register the same pulses as counter 72. At the end of a registering period these pulses could be registered in printer 21 in a suitable way. Also at the end of a registering period, counter 81 is switched off by the signal from 93. The final registering in 21 is suitably made in case of service or in case of an alarm signal from 73 or 20 showing that the number of faulty thyristors has reached a certain level.

The pulses may be recorded after each conducting interval for the thyristor rectifier, but as a rule sufficient security is obtained even if the selector 4 is working at a somewhat slower rate, for example recording for each of the working periods of the static converter or at still lower frequency. In this way, for example the recording circuits 8 and 21 may be common for all rectifiers to a static converter.

Another possibility is for the selector 4 to read the detectors 2 directly, thus completely omitting the memory devise 3. This can be done by having the selector 4 read a detector 2 after each conducting interval for the thyristor rectifier and being then stepped forward to the next detector. In this way, a reading will require a time corresponding to the same number of working periods as the number of thyristors n the rectifier. Even though this number may amount to a few hundred, the reading speed will be completely satisfactory.

Furthermore, this time may be reduced substantially if the detectors 2 are arranged with detaining output signals, thus giving the selector 4 the necessary time for reading. This will make the detectors 2 take over the memory function from 3.

Figure 4:
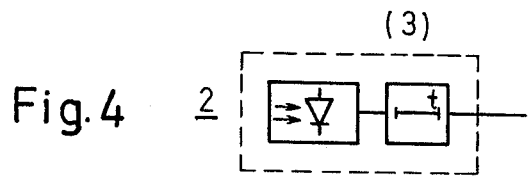
FIG. 4 shows a detail of a possible variation.

In FIG. 4, each of the detectors 2 is built together with its corresponding memory circuit 3, which is then formed as a monostable switch with a certain long switch off time so that detector 4 will have time to sense off all these circuits.

We claim:

1. A thyristor rectifier for a static converter comprising a plurality of thyristors (13-1n) each provided with a control device (1), a control circuit (22) for the entire rectifier operatively connected with said control devices, detectors (2) and means (12) responsive to the voltage over each thyristor to emit an indicating pulse to said detectors when the voltage over a thyristor amounts to a certain value, a sensing member comprising a selector (4) for recording the indicating pulses emitted through the detectors, one after the other at a certain frequency, a counter (7,20), means to transmit the pulses from the selector to the counter, and control units (5,9) to control and synchronize the selector and the counter in relation to each other.

2. A thyristor rectifier according to claim 1, comprising memory circuits (3) connected between said detectors (2) and said selector (4) to record said indicating pulses before they are sensed by the selector (4).

3. A thyristor rectifier according to claim 1, including a recording memory device (8,21), said counter (7,20) being connected in parallel with said recording memory device, said recording memory device being controlled by the same control unit (9) as the counter, to record the indicating pulses from the different detectors (2).

4. A thyristor rectifier according to claim 1, in which said detectors (2) include output means to emit output pulses with a prolonged duration in relation to said indicating pulses, the length of said output pulses corresponding to the required sensing time of the selector (4).

5. A thyristor rectifier according to claim 1, in which the control unit (5) includes means to control the step frequency of the selector so that one thyristor in the thyristor rectifier is sensed after each conducting interval of the whole thyristor rectifier.

* * * * *